(12) United States Patent
Mohring et al.

(10) Patent No.: US 7,083,657 B2
(45) Date of Patent: Aug. 1, 2006

(54) SYSTEM FOR HYDROGEN GENERATION

(75) Inventors: Richard M. Mohring, East Brunswick, NJ (US); Michael Strizki, Hopewell, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 679 days.

(21) Appl. No.: 10/223,871

(22) Filed: Aug. 20, 2002

(65) Prior Publication Data
US 2004/0035054 A1 Feb. 26, 2004

(51) Int. Cl.
*B01F 7/08* (2006.01)
*B01J 8/08* (2006.01)
*H01M 8/06* (2006.01)
*C01B 3/08* (2006.01)

(52) U.S. Cl. .................. 48/61; 48/127.9; 48/197 R; 423/657; 423/648.1; 423/658.2; 422/222; 422/225; 422/229

(58) Field of Classification Search .......... 48/61–89, 48/17–129, 197–199, 127.9, 197 R; 423/648–657, 423/648.1, 658.1; 422/129, 219, 222, 225, 422/229; 429/12–26; 23/280–288
See application file for complete search history.

(56) References Cited

U.S. PATENT DOCUMENTS

| | | | |
|---|---|---|---|
| 2,534,533 A | 12/1950 | Schlesinger et al. | |
| 3,210,157 A | 10/1965 | Lewis, Jr. et al. | |
| 3,449,078 A | 6/1969 | Ouik et al. | |
| 3,511,710 A | 5/1970 | Jung et al. | |
| 3,615,215 A | 10/1971 | Dohren et al. | |
| 4,931,154 A | 6/1990 | Hale et al. | |
| 5,205,841 A | 4/1993 | Vaiman | |
| 5,372,617 A * | 12/1994 | Kerrebrock et al. | ........... 48/61 |
| 5,372,849 A | 12/1994 | McCormick et al. | |
| 5,514,353 A | 5/1996 | Adlhart | |
| 5,599,640 A | 2/1997 | Lee et al. | |
| 5,804,329 A | 9/1998 | Amendola | |
| 6,287,192 B1 * | 9/2001 | Kim et al. | ............ 451/60 |
| 6,358,488 B1 | 3/2002 | Suda | |
| 6,534,033 B1 | 3/2003 | Amendola et al. | |
| 2002/0025462 A1 * | 2/2002 | Nakanishi et al. | ............. 429/19 |
| 2002/0166286 A1 * | 11/2002 | McClaine et al. | ........ 48/197 R |

FOREIGN PATENT DOCUMENTS

DE 1417753 10/1968
EP 1067091 11/2001

(Continued)

OTHER PUBLICATIONS

Maurice E. Indig and Richard N. Snyder, "Sodium Borohydride, An Interesting Anodic Fuel", Journal of the Electrochemical Society, vol. 109, pp. 1104-1106, Nov. 1962.

(Continued)

*Primary Examiner*—N. Bhat
(74) *Attorney, Agent, or Firm*—Dickstein Shapiro

(57) ABSTRACT

The present invention relates to an improvement in a system for the generation of hydrogen by contacting an aqueous solution of a metal hydride salt with a hydrogen generation catalyst. In particular, the present invention relates to the incorporation within the system of a recycle line of water condensed from the fluid product to the feed line to be contacted with the catalyst. the internal recycle line permits the use of a more concentrated solution of metal hydride as it is diluted by the recycle line prior to contact with the catalyst.

18 Claims, 4 Drawing Sheets

FOREIGN PATENT DOCUMENTS

| | | |
|---|---|---|
| EP | 1067091 | 10/2002 |
| JP | 51112495 | 4/1976 |
| WO | WO 9830493 | 7/1998 |

OTHER PUBLICATIONS

Amendola, et al., Book of Abstracts 218th ACS National Meeting, 864-868, Aug. 22, 1999.

Amendola, et al., "An ultrasafe hydrogen generator: aqueous, alkaline borohydride solutions and Ru catalyst," *Journal of Power Sources,* 85: 186-189 (2000).

MacCarley, Symposium on Alternate Fuel Resources; Santa Maria, Calif. Mar. 1976 vol. 20, pp. 315-321.

Kaufman et al. J. Chem. Soc. Dalton Trans. pp. 307-313, (1985).

Amendola et al: Abstract No. 545, The Electrochemical Society 195th Meeting May 2, 1999.

Amendola et al: Abstract No. 423, Joint International Meeting of the Electrochemical Society and the Electrochemical Society of Japan, Oct. 17, 1999.

Amendola et al. "A safe, portable, hydrogen gas generator using aqueous borohydride solution and Ru catalyst," *International Journal of Hydrogen Energy,* 25:969-975 (2000).

Amendola, et al. "A Novel Catalytic Process for Generating Hydrogen Gas From Aqueous Borohydride Solutions." *Advances in Hydrogen Energy,* 69-86 (2000).

Brown, et al. "New Highly Active Metal Catalysts for the Hydrolysis of Borohydride", *JACS,* 1493-1494 (1962) Abstract.

McClaine, Andrew W.; Breault, Dr. Ronald W.; Larsen, Christopher, Konduri, Dr. Ravi; Rolfe, Jonathan; Becker, Fred; and Miskolczy, Gabor, "*Hydrogen Transmission/Storage with Metal Hydride-Organic Slurry and Advanced Chemical Hydride/Hydrogen for Pemfc Vehicles*", Proceedings of the 2000 U.S. DOE Hydrogen Program Review, NREL/CP-570-28890.

Mohring, Richard M. and Luzader, Rex E.; *A Sodium Borohydride On-board Hydrogen Generator for Powering Fuel Cell and Internal Combustion Engine Vehicles;* Future Transportation Technology Conference., Aug. 20-22, 2001.

\* cited by examiner

SYSTEM FOR HYDROGEN GENERATION

The present invention relates to a system for generating hydrogen gas. In particular, the present invention relates to a hydrogen generation system including a stabilized metal hydride solution and a catalyst system.

BACKGROUND OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is therefore, essential for many applications that can use hydrogen. In particular, minimizing volume and weight of the hydrogen storage systems are important factors in mobile applications.

Several methods of storing hydrogen currently exist but are either inadequate or impractical for wide-spread consumer applications. For example, hydrogen can be stored in liquid form at very low temperatures. However, liquid hydrogen is neither safe nor practical for most consumer applications. Moreover, the energy consumed in liquefying hydrogen gas is about 60% of the energy available from the resulting hydrogen.

As a result of these and other disadvantages of hydrogen storage and transportation, the art has turned to fuel cells and systems for the generation of hydrogen. Such systems are known. for example Amendola et al, Abstracts ACS National Meeting, August, 1999, pages 864–868. describe such a system that is suitable for use in motor vehicles that is based on the catalyst generation of hydrogen from an aqueous metal hydride solution. In accordance with the present invention, an improvement in the operation of such systems is provided.

SUMMARY OF THE INVENTION

There is provided an improvement in a hydrogen generation system including a metal hydride solution and a catalyst that activates the reaction of the metal hydride with water to produce hydrogen gas. The system includes a means for condensing water vapor from the hydrogen product flow. The system is improved in accordance with the present invention by recycling a portion of the condensate water into the feed line to mix with and dilute the metal hydride fuel solution before it is contacted with the catalyst.

BRIEF DESCRIPTION OF THE DRAWINGS

The advantages of the present invention will be further understood from the following detailed description when considered with the accompanying drawings wherein.

DETAILED DESCRIPTION OF THE INVENTION

The system for the generation of hydrogen in accordance with the present invention is comprised of an aqueous metal hydride solution fuel and a catalyst for promoting the reaction of the metal hydride to produce hydrogen, a byproduct salt of the metal and water in the form of water vapor. This system has been demonstrated to produce hydrogen safely and efficiently for use in a hydrogen fuel cell that possesses many advantages over conventional fuel systems, such as gasoline engines.

Figure 1:
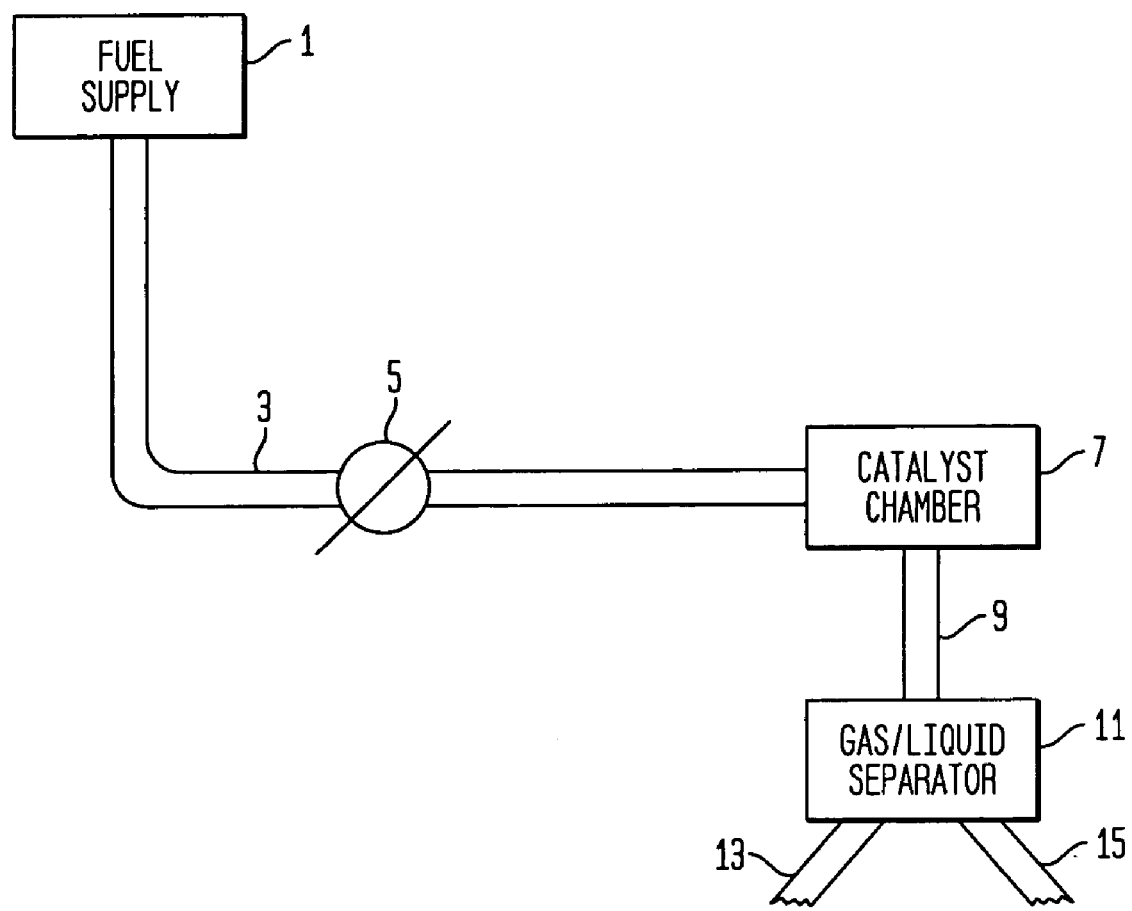
FIG. 1 is a block diagram of a conventional system for the generation of hydrogen from a metal hydride solution.

A conventional system for hydrogen generation from an aqueous metal hydride solution is shown in block diagram in FIG. 1. Aqueous metal hydride solution is withdrawn from a reservoir 1 through a conduit line 3 by a fuel pump 5 into a catalyst chamber or compartment 7 where it undergoes reaction to form a fluid product stream comprising hydrogen, a salt of the metal and water. The product stream is withdrawn through conduit line 9 into a gas liquid separator 11 where the byproduct salt is withdrawn as a solution through conduit line 13 and the gaseous hydrogen product mixture is withdrawn through conduit line 15. The system is completely inorganic and produces a high quality energy source without polluting emissions. The system is likewise readily controllable since hydrogen is only produced when the solution contacts the catalyst.

The metal hydride fuel component of the system illustrated in FIG. 1 and in the subject improved system is a complex metal hydride having the general formula $MBH_4$ wherein M is a positive ion selected from those of an alkali metal, such as sodium, potassium or lithium, certain organic groups and ammonium, B is a negative ion of a metal selected from Group 13 (formally Group IIIA) of the Periodic Table, such as boron, aluminum and gallium, and H is hydrogen. Examples of suitable metal hydrides, without intended limitation, include $NaBH_4$, $LiBH_4$, $NH_4BH_4$, $LiAlH_4$, $NaGaH_4$ and the like. These metal hydrides may be utilized in mixtures, but are preferably utilized individually. Preferred for such systems in accordance with the present invention are borohydrides, especially sodium borohydride ($NaBH_4$), lithium borohydride ($LiBH_4$), potassium borohydride ($KBH_4$), ammonium borohydride ($NH_4BH_4$), quaternary ammonium borohydrides and the like, including mixtures thereof.

A borohydride, such as illustrated above, will react with water to produce hydrogen gas and a borate in accordance with the following chemical reaction:

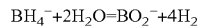

$$BH_4^- + 2H_2O = BO_2^- + 4H_2$$

This reaction takes place very slowly in the absence of a catalyst. It has further been found that the solution of metal hydride salt is stable without appreciable generation of hydrogen at alkaline pH. The salt formed in the reaction, borate in the instance of a metal borohydride, is non-toxic and environmentally safe. In addition, borate can be regenerated into borohydride for future use. It is important to note that all of the hydrogen atoms present in borohydride and water are converted to hydrogen gas, and that half of the hydrogen atoms in the hydrogen gas produced by the reaction given above actually come form the water.

In general, the various borohydride salts are soluble in water up to about 35%, lithium borohydride has only about 7% solubility, potassium borohydride about 19% and sodium borohydride about 35%. It will be appreciated that sodium borohydride is preferred for the practice of the present invention due to its comparatively high solubility. Where the concentration of the metal hydride in the fuel system exceeds the maximum solubility of the particular salt utilized, it will be in the form of a slurry or suspension. This is acceptable provided that only a minor portion of the metal hydride is not in solution and the fuel system includes a means of maintaining the uniformity of the slurry or suspension withdrawn to be exposed to the catalyst. As will be detailed below, the present invention is advantageous in that a slurry of the fuel borohydride may be utilized for greater economy of operation.

Since two molecules of water are consumed for each borohydride molecule during the reaction illustrated above, the product stream containing the borate salt is more concentrated than the borohydride fuel mixture. Stoichiometrically, twice as many water molecules as borohydride molecules are required to sustain a constant rate of reaction. In practice, water in excess of even that requirement is necessary for the efficient conversion of the sodium borohydride to hydrogen.

This excess water has heretofore been provided in two ways: charging the initial metal hydride solution with excess water, i.e. starting with a dilute solution, or adding more water from a separate source during or after the reaction. The second alternative is clearly preferable for reasons of economy since utilizing a dilute fuel solution would substantially increase the size of the fuel tank 3 in FIG. 1. It has been proposed in co-pending application Ser. No. 09/479,362 to utilize a separate source of water from the hydrogen-consuming device, e.g. a fuel cell, combustion engine or a gas turbine. Since these devices consume hydrogen, a main by-product is water and it is proposed to utilize some of this water to maintain a constant rate of reaction in the subject hydrogen generators. However, such use still represents a source of water external to the system. It is often the case that such water is utilized in a humidification loop to maintain the membrane in a proton exchange membrane (PEM) fuel cell and is not available for recycle to other parts of the system.

The concept of recycling water from the device, e.g. a fuel cell, has been proposed as well in U.S. Patent Application Publication No. US 2002/0025462, published Feb. 28, 2002. The disclosed system includes a condenser to remove water from the hydrogen gas stream by radiative cooling as well. Further, MacCarley, Symposium on Alternative Fuel Resources, Santa Monica, Calif., March 1976, pages 315–320, in discussing hydrogen systems for automotive application describes condenser loops for the removal of water from the generated hydrogen gas stream. However, the paper does not specifically mention the recycling of water and gives no detail as to how or where the recycling would be carried out. As will be shown below, the present invention improves on this concept by providing a recycle of water within the hydrogen generator itself thereby significantly enhancing the economies of its operation.

The metal hydride solution utilized as the fuel for the system is stabilized against decomposition by being at an alkaline pH, i.e. a pH of at least above pH 7. This is carried out by the addition of a suitable alkaline stabilizing agent, preferably a hydroxide, most preferably an alkali metal hydroxide. It is particularly preferred that the cation portion of the alkaline stabilizing agent be the same as the cation of the metal hydride salt. For example, if the metal borohydride is sodium borohydride, the alkaline stabilizing agent would be sodium hydroxide, both of which are preferred in the practice of the present invention. The concentration of the alkaline stabilizing agent is typically greater than about 0.1 molar, preferably greater than 1.0molar or about 4% by weight. The alkaline stabilizing agent is typically added to the water prior to the addition of the borohydride thereto. Sodium hydroxide is a particularly preferred stabilizing agent due to its high solubility in water (about 44%) which allows stability of the solution without adversely affecting the solubility of the metal borohydride. The presence of the alkaline stabilizing agent prevents premature reaction and degradation of the metal hydride salt before it contacts the catalyst.

The catalyst in the subject system is present in a containment means so that it can be separated from the reacted metal hydride solution which, in the instance of a sodium borohydride fuel mixture, would contain a mixture of $NaBO_2$ and $NaBH_4$. Containment may be any physical, chemical, electrical and/or magnetic means of securing the catalyst. Containment systems are preferably a tube or cylinder retaining the catalyst between mesh or porous ends such that the solution can flow through during the reaction and the product liquid/gas mixture is withdrawn from the downstream end. Other similar means will be readily apparent to those of ordinary skill in the art.

The catalyst can also be attached or bound to a suitable substrate, i.e. a supported catalyst, and thereby be contained in that the substrate is held in place while the solution of metal hydride passes over it. Thus, hydrogen production can be controlled by either contacting or separating the bound catalyst from the metal hydride solution. An example of such a catalyst is one entrapped by physical or chemical means onto and/or within a porous or nonporous substrate. Nonlimiting examples of porous substrates include ceramics and ion exchange resins. Nonlimiting examples of nonporous substrates include metallic meshes, fibers and fibrous materials. The preparation of such supported catalysts is taught, for example in copending application Ser. No. 09/999,226, the disclosure of which is incorporated herein by reference.

Preferably, the catalyst facilitates both aspects of the reaction of the metal hydride and water, i.e. the availability of a hydrogen site and the ability to assist in the hydrolysis mechanism. Metal hydride solutions are complex systems having multi-step reduction mechanisms. For example, borohydride has four hydrogens and an eight-electron reduction mechanism. Thus, once a single hydrogen atom is removed from a borohydride molecule, the remaining moiety is unstable and will react with water to release the remaining hydrogen atoms. Catalysts that are useful in the system of the invention include, without intended limitation, transition metals, transition metal borides, alloys of these materials and mixtures thereof.

Suitable transition metal catalysts for the generation of hydrogen from a metal hydride solution are known in the art and include metals from Group 1B to Group VIIIB of the Periodic Table, or compounds made from these metals. Representative examples of these metals include, without intended limitation, transition metals represented by the copper group, zinc group, scandium group, titanium group, vanadium group, chromium group, manganese group, iron group, cobalt group and nickel group. These catalyst metals aid in the reaction by adsorbing hydrogen on their surface in the form of the protonic $H^+$. Examples of useful catalyst metals include, without intended limitation, ruthenium, iron, cobalt, nickel, copper, manganese, rhodium, rhenium, platinum, palladium, chromium, silver, osmium, iridium borides thereof, alloys thereof and mixtures thereof. Ruthenium, rhodium and cobalt are preferred.

The catalysts preferably have high surface area, i.e. they have small average particle sizes, for example an average diameter of less than about 100 microns, preferably less than about 50 microns, most preferably less than about 25 microns. The chemical reaction of metal hydrides in water in the presence of the catalyst follows zero order kinetics at all concentrations of metal hydride measured, i.e. the volume of hydrogen gas generated is linear with time. It is, therefore, believed that the reaction rate depends primarily on the surface area of the catalyst. In addition to metal particles having very small average particle size, larger particles, e.g. agglomerates may be utilized provided that they have sufficient porosity to possess the requisite surface area.

In the system improved upon in accordance with the present invention, the generation of hydrogen can be controlled by regulating contact of the solution with the catalyst because little hydrogen will be generated from the stabilized solution in its absence. Control can be effected, for example, by regulating the flow of solution to the catalyst, or by withdrawing the catalyst from the solution to cease production. It has been found that hydrogen generation is increased with increases in temperature and is fairly constant at a given temperature until the metal hydride solution is almost exhausted. It will be appreciated by those of ordinary skill in the art that the desired rate of reaction can be obtained and controlled by factors including regulation of the temperature, the concentration of the alkaline stabilizing agent the selection of a catalyst the surface area of the catalyst and the like.

Several methods are available to contact the stabilized metal hydride solution with the catalyst system. When hydrogen is required, the solution can be pumped to a chamber containing the catalyst or the catalyst can be moved into a tank containing the solution. The metal hydride solution can be pumped either in batches or continuously. The instantaneous demand for hydrogen can be met with a small buffer tank, not illustrated, that always contains a supply of available hydrogen gas. The hydrogen gas from this tank can be utilized to meet immediate demand and the resultant pressure drop can trigger the system to produce more hydrogen gas, thereby maintaining a constant supply of hydrogen available to the hydrogen-consuming device.

Figure 2:
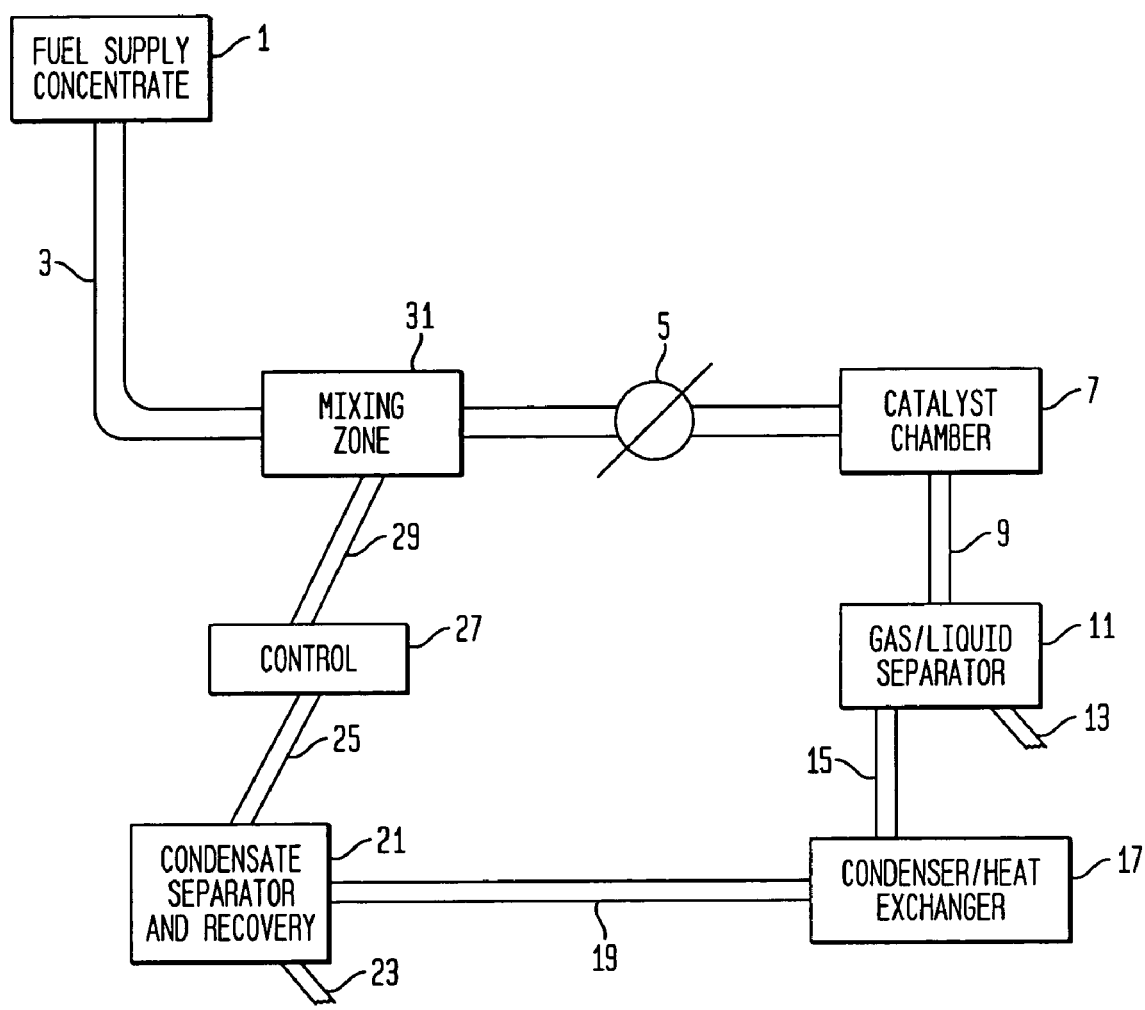
FIG. 2 is a block diagram of the improved system of the present invention.

As illustrated by FIG. 2, the conventional system shown in FIG. 1 is improved upon in accordance with the present invention by the addition of a recycle stream of condensate water to the feed into the catalyst chamber 7. In FIG. 2, structures that are the same as shown in FIG. 1 have like numbering. In FIG. 2, the gaseous product stream of hydrogen and water in the form of steam exiting gas/liquid separator 11 through conduit line 15 is cooled in a condenser/heat exchanger 17 and caused to pass into a separation and recovery zone 21 through conduit line 19. In condensate recovery zone 19, the pressure is reduced so that the hydrogen product with some residual water vapor separates from liquid water and is withdrawn through product conduit line 23. It is not necessary to effect a total separation of the water in the product gas since, as discussed above, it is beneficial to have some water vapor therein. The recovered water is caused to flow through conduit line 25 to a control unit 27 that may be a valve or simply an orifice to restrict flow, and then via conduit line 29 to mixing zone 31 where it is mixed in the desired proportion with the incoming metal hydride fuel supply to form a diluted fuel mixture that is fed into catalyst chamber 7 by pump 5 as described with reference to FIG. 1.

There are several advantages realized by the recycle system illustrated in FIG. 2. The most important of these is probably the economy of being able to store and utilize a concentrated metal hydride solution fuel supply. This allows the use of a smaller fuel reservoir without sacrificing the duration of hydrogen generation between refueling the system. It is possible as mentioned above to utilize a metal hydride fuel supply of such concentration that a minor portion of the metal hydride is not in solution resulting in a suspension or supply. It is also possible to utilize a solution containing the maximum concentration of metal hydride with the possibility that, with environmental changes, a portion thereof may come out of solution. If a minor portion of the metal hydride is not in solution be design or due to environmental changes, the amount of water admitted to mixing zone 31 by control means 27 would be increased such that complete solubilization thereof and the desired dilution are both achieved prior to introduction of the fuel solution to catalyst chamber 7. It would also be preferable to have in conjunction with fuel supply 1, a mixing means, not shown, such as a mechanical stirrer or turbulence agitator that would assure that the slurry provided from the fuel supply 1 is substantially uniform.

It will be appreciated that the amount of the metal hydride salt that is not in solution in the fuel supply concentrate is limited by the configuration of the system, the amount of water that can be added thereto through conduit 29, the time available to affect solubilization thereof and the like. Typically, the fuel supply will contain no more than about 5% of undissolved metal hydride.

A second advantage of the recycle system provided in accordance with the present invention is that the addition of water from the recycle line maintains a dilute fuel feed thereby significantly reducing the possibility of the system becoming clogged as a result of the water being used up to the point where there is insufficient water exiting the catalyst chamber 7 to maintain the product salt, a borate in the case of the fuel being a metal borohydride, in solution. Precipitation of the product salt in the catalyst chamber itself or in any of the associated downstream apparatus of piping will render the system ineffective until disassembled and cleaned. Such a problem can be very significant in terms of the use of such systems as an alternate power source for vehicles.

A further advantage of the system of the invention is that the water exiting the condensate recovery tank 21 is at a significantly lower temperature than in the catalyst chamber 7, hence it functions as an aid in controlling the temperature of the reaction which is exothermic. This added control of system operating temperature is also significant in the contemplated use of the system to power vehicles. More important, however, is the fact that the regulating capacity of the system assures a substantially constant flow of product hydrogen, a commercially significant advantage. A still further advantage of the system of the invention is the fact that the recycle system is internal of the system, i.e. it can be within the system itself so that there is no need for external apparatus such as tanks and/or conduits to introduce water from an external source.

Figure 3:
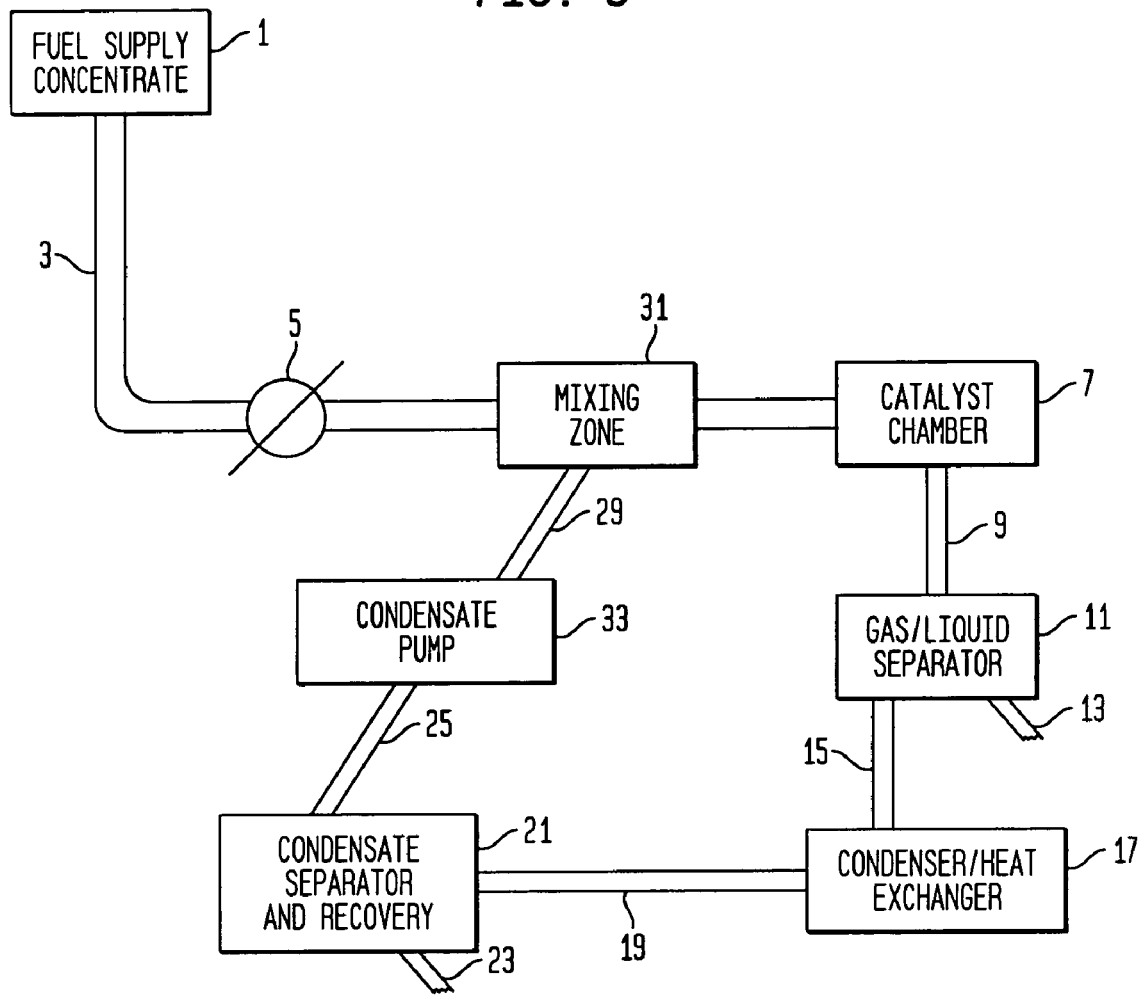
FIG. 3 is a block diagram of an alternative embodiment of the improved system of the present invention.

Another embodiment of the improved system according to the present invention is shown in FIG. 3, wherein like structures have like numbering. In FIG. 3, the metering of the diluted fuel into the mixing zone 31 is effected by the fuel pump 5 that is located upstream of mixing zone 31 and by a second pump, condensate pump 33, also located upstream of mixing zone 5. Regulation of these two pumps produces the proper feed into mixing zone 5 so that the desired dilution is achieved.

Figure 4:
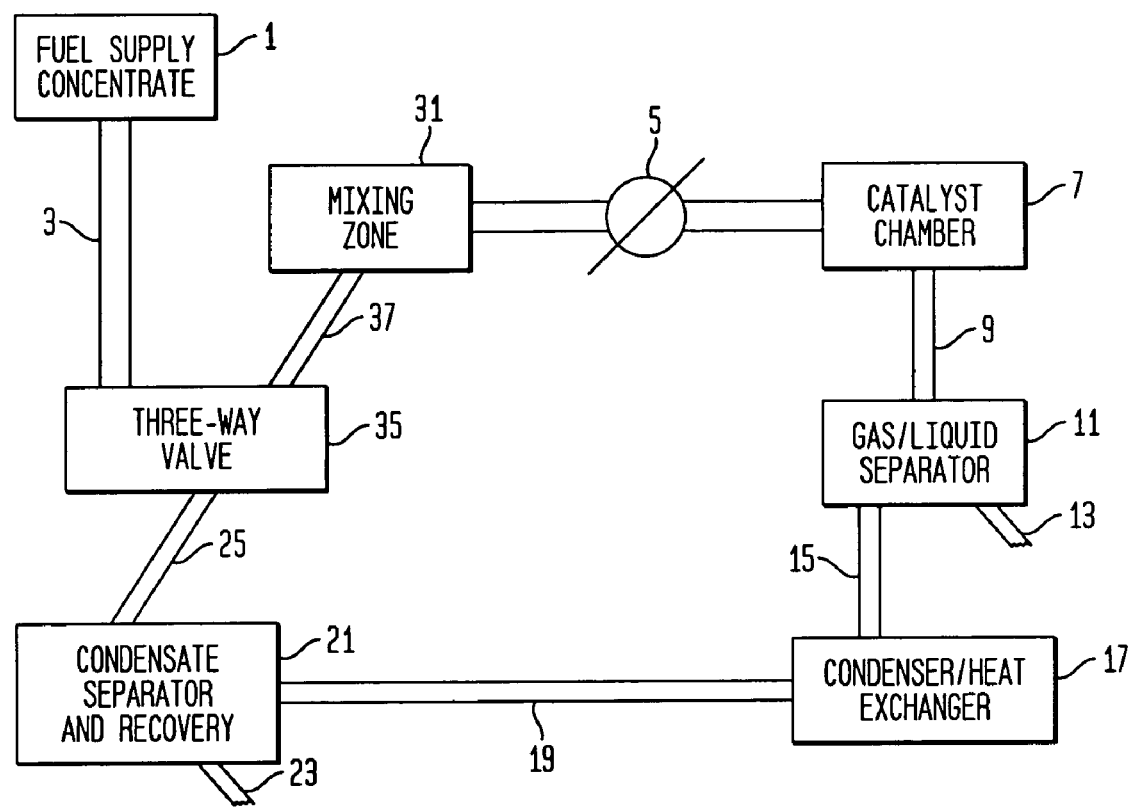
FIG. 4 is a block diagram of a still further embodiment of the improved system of the present invention.

In a further embodiment of the present invention shown in FIG. 4, wherein similar structures have like numbering, the mixing zone 31 is upstream of fuel pump 5. Flow of condensate water and concentrated fuel mixture into mixing zone 5 is regulated by a three-way valve 35, such as a toggle valve, that controls the amounts of each feed by alternating flow thereof into the mixing zone 5. In each instance, control of the proper dilution of the fuel mixture that enters the catalyst chamber 7 is effect by conventional sensing apparatus, not shown, that feeds information into computer means, not shown, that in turn regulates the amount of each component of the fuel mixture introduced into the mixing zone 5 through conduit line 37. Such apparatus as well as the placement and use thereof to establish the proper dilution of the fuel mixture to be introduced into the mixing zone 5 is considered to be within the skill of the art.

The following example further describes and demonstrates the improved operation of the subject system according to the present invention. The example is given solely for the illustration purposes and is not to be construed as a limitation of the present invention.

EXAMPLE

A hydrogen generation test system according to FIG. 2 was constructed to bench test the improved system of the invention. The mixing zone 5 was a static incline tube mixer consisting of tubing containing a twisted piece of metal. The fuel supply concentrate tank 1 contained a 30% aqueous solution of sodium borohydride that was passed into the system at a flow rate of approximately 850 mL/min. The condensate recycle was fed into the mixing zone 31 at a flow rate of approximately 300 mL/min. In spite of fluctuations in liquid flow rates caused by pressure variations within the system, the ratio of fuel concentrate to condensate was kept nearly constant so as to maintain a nearly constant dilute effective fuel concentration. The effective concentration of fuel solution introduced into the catalyst chamber 7 for a test run was approximately 22%. Both effective rate of hydrogen generation and conversion of the sodium borohydride fuel solution for the system were constant over the run. It will be appreciated that the ability of the improved system accordance with the present invention to control the variables necessary to maintain a constant product flow is significant for such uses as the powering of vehicles.

We claim:

1. A hydrogen generation system comprising:
   (a) a fuel supply reservoir containing an aqueous solution of at least one metal hydride;
   (b) a fuel pump configured to withdraw said solution and contact it with a hydrogen generation catalyst thereby generating a fluid product stream comprising hydrogen, water and a salt of said metal;
   (c) a gas-liquid separator configured to separate said fluid stream into a gaseous product comprising hydrogen and water vapor, and a liquid comprising water and said metal salt;
   (d) a condenser in fluid flow communication with said gaseous product to condense water therefrom;
   (e) a condensate recovery zone configured to recover said condensed water; and
   (f) a mixing zone configured to combine said condensed water with said aqueous solution of metal hydride withdrawn from said reservoir thereby diluting said solution prior to contacting said solution with the hydrogen generation catalyst.

2. A hydrogen generation system in accordance with claim 1, wherein said mixing zone is upstream of said fuel pump.

3. A hydrogen generation system in accordance with claim 1, wherein said mixing zone is located in fluid flow between said fuel pump and the hydrogen generation catalyst.

4. A hydrogen generation system in accordance with claim 3, additionally containing a pump configured to withdraw condensed water from said condensate recovery zone and introduce it into said mixing zone.

5. A hydrogen generation system in accordance with claim 1, additionally containing a valve upstream of the mixing zone configured to permit alternative flow of said metal hydride solution and condensed water from said condensate zone into said mixing zone.

6. A hydrogen generation system in accordance with claim 1, configured such that the concentration of said metal hydride in the fuel supply reservoir is above the maximum solubility of the hydride and a portion thereof is in suspension.

7. A hydrogen generation system in accordance with claim 6, configured such that sufficient condensed water is added to the mixing zone so that all of the metal hydride is in dilute solution when it contacts the hydrogen generation catalyst.

8. A hydrogen generation system in accordance with claim 6, additionally including mixing means in the fuel supply reservoir to maintain uniformity of said suspension.

9. A hydrogen generation system in accordance with claim 1, configured such that said aqueous solution of metal hydride solution further comprises a sufficient amount of an alkaline stabilizing agent to provide a pH thereof at about pH 7.

10. A hydrogen generation system in accordance with claim 9, wherein the alkaline stabilizing agent is a hydroxide.

11. A hydrogen generation system in accordance with claim 9, wherein the cation portion of the alkaline stabilizing agent is the same as the cation portion of said metal hydride.

12. A hydrogen generation system in accordance with claim 11, wherein said cation is sodium ion.

13. A hydrogen generation system in accordance with claim 12, wherein the alkaline stabilizing agent is sodium hydroxide and the metal hydride is sodium borohydride.

14. A hydrogen generation system in accordance with claim 1, further comprising a containment system configured to separate the catalyst from said salt of the metal in the fluid product stream.

15. A hydrogen generation system in accordance with claim 14, wherein said containment system comprises a cylinder having said catalyst therein.

16. A hydrogen generation system in accordance with claim 1, wherein said hydrogen generation catalyst comprises a transition metal selected from the group consisting of ruthenium, iron, cobalt, nickel, copper, manganese, rhodium, rhenium, platinum, palladium, chromium, silver, osmium, iridium, borides thereof, alloys thereof, and mixtures thereof.

17. A hydrogen generation system in accordance with claim 1, wherein the metal hydride is selected from the group consisting of sodium borohydride, lithium borohydride, potassium borohydride, ammonium borohydride, and mixtures thereof.

18. A hydrogen generation system in accordance with claim 1, wherein the catalyst is a supported catalyst.

* * * * *